Sept. 20, 1932.    E. B. BRADLEY    1,878,461

DETACHABLE TOP FOR RUMBLE SEATS OF MOTOR VEHICLES

Filed Oct. 18, 1928    2 Sheets-Sheet 1

E. B. Bradley
Inventor

By C. A. Snow & Co.
Attorneys.

Sept. 20, 1932. E. B. BRADLEY 1,878,461
DETACHABLE TOP FOR RUMBLE SEATS OF MOTOR VEHICLES
Filed Oct. 18, 1928 2 Sheets-Sheet 2
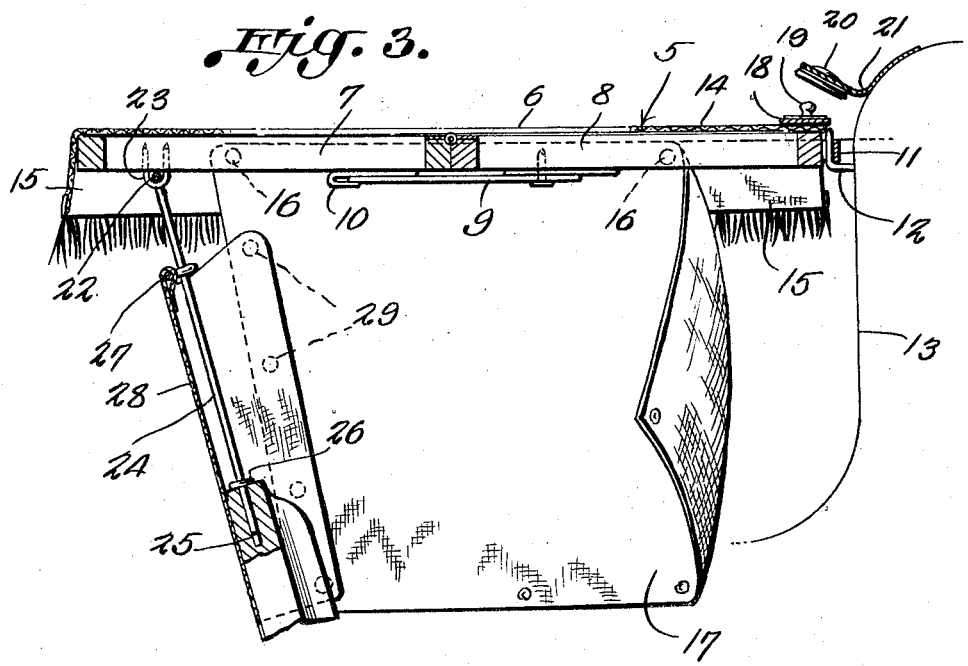
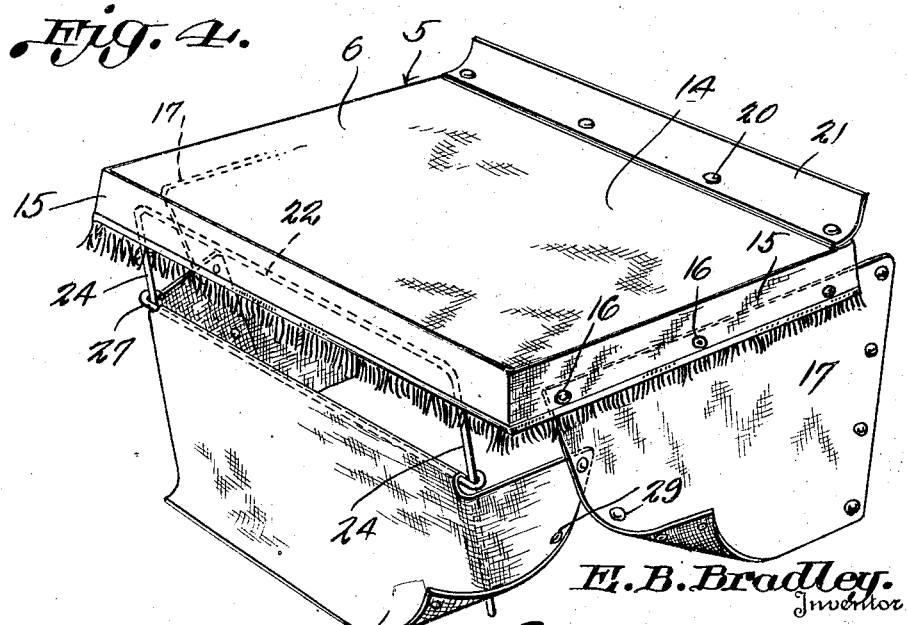

Patented Sept. 20, 1932

1,878,461

UNITED STATES PATENT OFFICE

EDGAR BRADSHAW BRADLEY, OF GASTONIA, NORTH CAROLINA

DETACHABLE TOP FOR RUMBLE SEATS OF MOTOR VEHICLES

Application filed October 18, 1928. Serial No. 313,281.

This invention relates to motor vehicles and more particularly to motor vehicles having rumble seats, the primary object of the invention being to provide a removable top for the rumble seat of a motor vehicle, so that persons riding on the rumble seat will not be exposed to inclement weather.

An important object of the invention is to provide a removable top of this character which may be readily and easily folded into a small and compact article to facilitate storing of the top, novel means being provided for holding the foldable sections of the top in their extended positions.

Another object of the invention is the provision of removable curtains which may be readily and easily positioned to close the sides of that portion of the motor vehicle, adjacent to the rumble seat.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a longitudinal sectional view through the top.

Figure 4 is a perspective view of the top removed.

Figure 1:
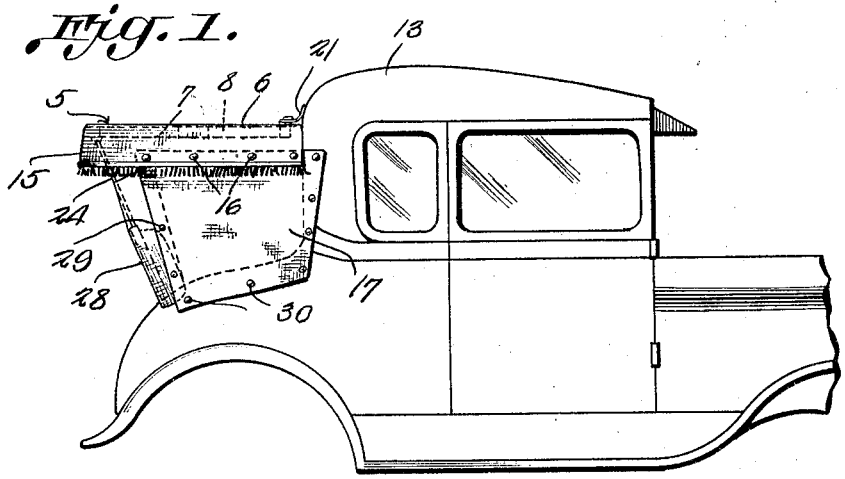
Figure 1 is a side elevational view of the body of a motor vehicle, showing an auxiliary top for the rumble seat thereof.
Figure 2:
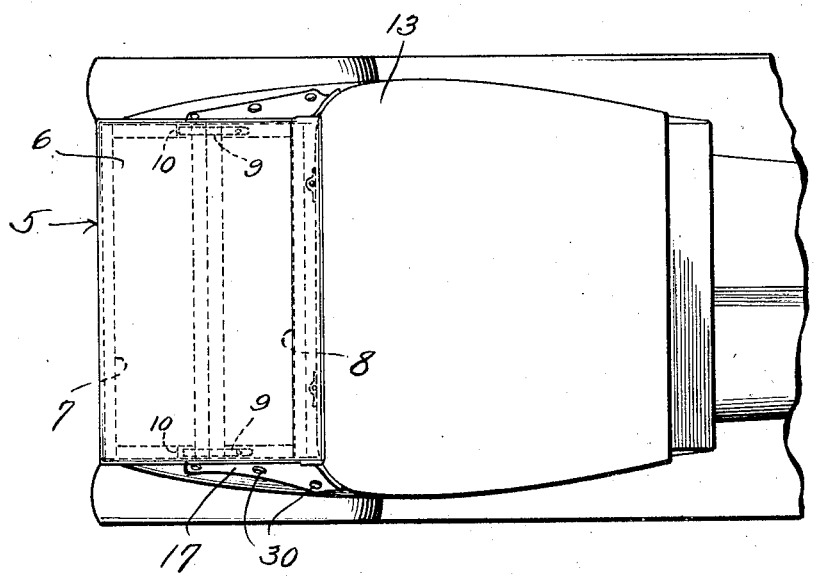
Figure 2 is a plan view thereof.

Referring to the drawings in detail, the auxiliary top is indicated generally by the reference character 5 and includes a roof section 6 embodying hingedly connected members 7 and 8 respectively which are adapted to be folded upon each other to facilitate the storing of the top, when not in use.

Pivoted bracing members 9 are connected with the sections of the top and are adapted to swing under the keepers 10 carried by one of the sections, to hold the top in its extended position, it being understood that the bracing members 9 are pivotally connected to one of the sections of the top, as clearly shown by Figure 3.

At the forward end of the top, are straps 11 defining openings to receive the upwardly extended hooks 12 so that the top may be readily positioned in such a way as to insure against movement of the auxiliary top, with respect to the body 13 of the motor vehicle with which the auxiliary top is used.

A suitable covering 14 covers the auxiliary top sections, and is so constructed that the sides and ends thereof extend downwardly appreciable distances as at 15, where they are provided with snaps 16 to permit the side curtains, which are indicated by the reference character 17, to be secured thereto.

Secured along the forward edge of the top is a strip 18 which carries the ball sections 19 of the fasteners, the socket sections 20 of the fasteners being carried by the strip 21 that is secured to the body of the motor vehicle with which the auxiliary top is used, to the end that a water-tight connection may be made between the auxiliary top and body 13 of the motor vehicle.

The rear of the auxiliary top is supported by means of the rod 22 that has pivotal connection with the section 7 of the top, at 23, the ends of the rod 22 extending downwardly as at 24, the free end thereof being designed for positioning in openings such as indicated at 25, and which are formed in the upper edge of the back of the rumble seat, there being provided stops 26 for restricting the movement of the ends 24 within the openings 25.

These downwardly extended end portions 24 also provide a support for the rod 27 that has its ends looped around the end portion 24. Secured to this rod 27 is a rear curtain 28 that has fasteners 29 secured along its side edges, which fasteners are adapted to cooperate with fasteners positioned along the rear edges of the side curtains 17, to secure the side curtains to the rear curtain.

Fasteners 30 are secured along the lower edges of the side curtains 17 and are adapted to be positioned over fasteners secured to the body of the car adjacent to the rumble seat, as shown by Figure 1.

As clearly shown by Figures 3 and 4 of the drawings, the upper edge of the rear curtain 28 is spaced from the top of the car providing an opening for ventilation and at the same time permit the driver to determine whether or not machines are approaching from the rear.

From the foregoing it will be obvious that due to the construction shown and described, the auxiliary top may be readily and easily removed, and folded into a small and compact article for storing under the seat of the car.

It will also be seen that the top may be readily removed from its place of storage and set up to protect the occupants of the rumble seat of the motor vehicle.

I claim:

1. In an auxiliary top for the rumble seat of a motor vehicle, a frame comprising a rear horizontal rod having downwardly extended end portions adapted to fit into openings of the rumble seat, a horizontal rod having loops at its ends, into which the downwardly extended end portions fit to slidably support the horizontal rod, and a curtain secured to the horizontal rod and supported thereby.

2. In an auxiliary top for the rumble seat of a motor vehicle, a frame including an upper horizontal rod and downwardly extended ends, a horizontal rod having eyes at its ends into which the downwardly extended ends fit, a curtain secured to the horizontal rod, and means for securing the ends of the curtain.

In testimony that I claim the foregoing as my own, I have hereto affixed my signature.

EDGAR BRADSHAW BRADLEY.